United States Patent Office 3,845,084
Patented Oct. 29, 1974

3,845,084
PROCESS FOR THE CLEAVAGE OF A-RING AROMATIC, STEROIDAL METHYL ETHERS
Reinhardt P. Stein, Audubon, Pa., assignor to American Home Products Corporation, New York, N.Y.
No Drawing. Filed Oct. 15, 1973, Ser. No. 406,737
Int. Cl. C07c *169/08*
U.S. Cl. 260—397.5                                9 Claims

ABSTRACT OF THE DISCLOSURE 3,8,17 - Trihydroxy-13-alkyl-1,3,5(10)-gonatrienes and their $\Delta^7$ and $\Delta^8$ dehydro derivatives are prepared. The products of the process are hormonally active and are also useful as intermediates for the preparation of other hormonally active steroids. Among the valuable products of the process is 17β-dihydroequilin.

BACKGROUND OF THE INVENTION

This invention relates to compositions of matter known in the art of Organic Chemistry as Steroids. More particularly, the invention relates to a new and useful process for the basic cleavage of steroid aromatic A-ring methyl ethers.

Cleavage of the alkyl portion of an alkyl, aryl ether is well-known in the art, and is most usually accomplished by the use of an acidic reagent such as hydrobromic acid, aluminum chloride, pyridine hydrochloride, and the like. These reagents have the distinct disadvantage of causing undesired transformations in molecules which contain additional acid labile substituents. Thus the 3-methyl ethers of both 16α,17β-estriol and 16β,17β-estriol afford estrone in good yield when treated with pyridine hydrochloride [J. C. Sheehan, W. F. Erman, and P. A. Cruickshank, J. Am. Chem. Soc., 79, 147 (1957)], the desired methyl ether cleavage being accompanied by the dehydration of the 16,17-glycol group.

The utility of basic reagents for ether cleavage is also known, thus use of grignard reagents (U.S. Pat. 3,436,-411), aqueous methylamine [I. M. Lockhart and N. E. Webb, Chemistry and Industry, 1230 (1970)], and sodium methoxide [J. S. Zoltewicz and A. A. Sale, J. Org. Chem., 35, 3462 (1970)] have been reported. It has now been found that by using basic reagents and carefully selecting the reaction conditions the methyl group of certain steroid, aromatic A-ring, methyl ethers may be cleaved. Surprisingly, it has been observed that the steroid substrates of the instant invention which contain other labile functions suffer no additional chemical modifications when subjected to the strenuous reaction conditions of the instant invention. Thus, when the starting material of the instant invention contains additional unsaturation at the 7, or 8(9) positions the molecule undergoes none of the expected rearrangements, isomerizations, or dehydrogenations. Most unexpectedly, when the starting material of the instant invention contains a hydroxyl group at the 8 position the molecule does not dehydrate, an occurrence one might expect when subjecting such a substrate to the strenuous conditions of the instant process. Thus by the practice of the process of the instant invention it is now possible to prepare compounds which were heretofore either inaccessible, or very difficult to produce because of economic or other practical considerations.

SUMMARY OF THE INVENTION

The invention sought to be patented resides in the concept of a process for preparing a compound of the formula:

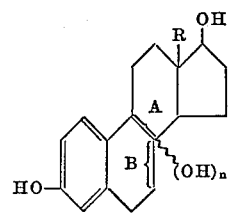

I wherein R is alkyl of from 1 to 6 carbon atoms; A and B are both saturated linkages and n is 1, or one of A and B is an unsaturated linkage and n is 0; which comprises treating a compound of the formula:

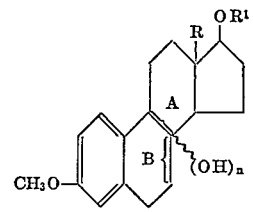

II wherein A, B, R, and n are as defined above and $R^1$ is hydrogen or carboxylic acyl of from 1 to 6 carbon atoms, with a base selected from the group of aqueous methylamine, ammonium hydroxide or an alkali metal alkoxide containing from 1 to 6 carbon atoms in an alkanol containing from 1 to 6 carbon atoms at a temperature of from 180° to 300° C.

DESCRIPTION OF THE INVENTION

For reasons of convenience in describing the invention, the process is described using a specific embodiment of the invention. The use of a specific embodiment to illustrate the invention is merely descriptive and is not intended to delimit the scope of the invention. It will be recognized, that when an 8-hydroxyl substituent is present in any of the molecules described herein it may be in either of the two possible stereomeric configurations and this is indicated by a wavy line (∼).

In carrying out the process of the instant invention, the steroid starting material is dissolved or suspended in the chosen basic medium and heated at a temperature of from about 180° to about 300° C. for times of about 2 hours to about 24 hours. It has been found, that at the higher reaction temperatures shorter reaction times are necessary to substantially complete the reaction and at the lower reaction temperatures longer reaction times are necessary in order to substantially complete the reaction. Thus at a temperature of 240° C., utilizing 40% aqueous methylamine solution as the base, d-3-methoxyestera-1,3,5(10),7-tetraen-17β-ol is substantially demethylated in 6 hours; and at a temperature of 290° C. the same reaction is substantially complete in only 3 hours.

The choice of the basic reactant, the reaction time, and the reaction temperature is within the skill of the art, and the optimal combination of these three variables for each different steroid substrate is not to be classified a

3 critical aspect of the instant invention. Among the preferred basic reagents for the instant process are 40% aqueous methylamine, concentrated ammonium hydroxide solution, and sodium methoxide in methanol and though it is not to be considered critical to the teaching of the instant process, these preferred basic reagents have been found to possess different optimal ranges of reaction temperatures and reaction times. These ranges have been observed to give the best results in the process of the instant invention when utilized with their corresponding basic reagents and these variables are disclosed in Table I.

TABLE I

| Basic reagent | Optimal temperature range, °C. | Optimal time range, hours |
|---|---|---|
| 40% aqueous methylamine | 230–300 | 2–7 |
| Concentrated ammonium hydroxide | 240–260 | 5–7 |
| Sodium methoxide in methanol | 220–245 | 4–6 |

It will be obvious to those skilled in the art, that utilization of the basic reagents of the invention at the temperatures specified will require a reaction vessel which may be closed from the atmosphere and will also be capable of withstanding increased internal pressures. A reaction vessel possessing these characteristics would be of the type in common use for high pressure hydrogenations, and commonly referred to as a "steel hydrogenation bomb." These "bombs" usually have containers which provide for controlled heating and agitation of their contents and have been found to be very convenient for carrying out the process of the instant invention.

Once the heating period for the reaction has been completed, the product may be collected and purified by any one of a variety of methods known in the art. Thus for example, the cooled reaction mixture may be poured into ice water, acidified with, for example ammonium chloride, and the product may be collected by filtration or extraction with a solvent such as ethyl acetate or ether. The filtered solid or extract concentrate may be purified by for example, recrystallization from an appropriate solvent, or by chromatography.

It will be obvious to those skilled in the art that other substituents contained in the starting material which are commonly removed by the action of bases will be removed by the process of the instant invention. Thus, when the starting material contains an ester function in the 17-position, the acyl portion of the ester will be removed by the instant process and the 17-ol will result.

The compounds obtainable by the process of the instant invetinon may be utilized to prepare equilin, its analogs and homologs by, for example, the process taught in U.S. Pat. 3,555,015.

EXAMPLE 1

$d$-Estra-1,3,5(10),7-Tetraene-3,17$\beta$-Diol
(17$\beta$-Dihydroequilin)

Charge a steel bomb with $d$-3-methoxyestra-1,3,5(10), 7-tetraen-17$\beta$-ol, formate (1.00 g.) and 40% aqueous methylamine solution (8 ml.), seal then heat in a Woods metal bath to 240° C. for 6 hours. Cool, pour the contents into cold water then add solid ammonium chloride and sodium chloride to precipitate the product. Extract with ethyl acetate, wash, dry and evaporate the extract in vacuo. Treat the oil in ether with activated charcoal, filter and evaporate the filtrate in vacuo. Crystallize from chloroform to obtain 550 mg. of $d$ - estra - 1,3,5(10),7-tetraene-3,17$\beta$-diol (17$\beta$-dihydroequilin), m.p. 163–166°.

EXAMPLE 2

$d$-Estra-1,3,5(10),7-Tetraene-3,17$\beta$-Diol
(17$\beta$-Dihydroequilin)

Charge a steel bomb with $d$-3-methoxyestra-1,3, 5(10),7-tetraen-17$\beta$-ol (1.00 g.) and 40% aqueous methylamine solution (8 ml.), seal then heat in a Woods metal bath to 290° C. for 3 hours. Cool and pour the contents into cold water, add solid ammonium chloride and sodium chloride and extract with ethyl acetate. Wash, dry and evaporate the extract in vacuo. Treat the oil in tetrahydrofuran with activated charcoal, filter and evaporate the solvent in vacuo. Crystallize from chloroform to obtain 0.38 g. of $d$ - estra-1,3,5(10),7-tetraene-3,17$\beta$-diol (17$\beta$-dihydroequilin); m.p. 160–163°.

EXAMPLE 3

$dl$-Estra-1,3,5(10),8-Tetraene-3,17$\beta$-Diol

Charge a steel bomb with $dl$-3-methoxyestra-1,3,5(10), 8-tetraen-17$\beta$-ol (1.00 g.) and 40% aqueous methylamine solution (8 ml.), seal and heat in a Woods metal bath to 250–260° C. for 6 hours. Cool and pour the contents into water. Add solid ammonium chloride and sodium chloride then extract with ethyl acetate. Wash, dry and evaporate the extract in vacuo. Treat the residue in tetrahydrofuran with activated charcoal, filter and evaporate in vacuo. Crystallize from chloroform to obtain 0.42 g. of $dl$-estra-1,3,5(10),8-tetraene-3,17$\beta$-diol, m.p. 212–219°.

EXAMPLE 4

$dl$-Estra-1,3,5(10)-Triene-3,8$\alpha$,17$\beta$-Triol

Chargle a steel bomb with $dl$-3-methoxyestra-1,3,5(10)-triene-8$\alpha$,17$\beta$-diol (1.00 g.) and 40% aqueous methylamine solution (15 ml.), seal and heat in a Woods metal bath to 240° C. for 6 hours. Cool, pour the contents into cold water then add solid ammonium chloride and sodium chloride to precipitate the product. Extract with ethyl acetatae, wash, dry and evaporate the extract in vacuo. Treat the residue in tetrahydrofuran with activated charcoal, filter and evaporate in vacuo. Crystallize from chloroform to obtain 0.54 g. of $dl$-estra-1,3,5(10)-triene-3,8$\alpha$,17$\beta$-triol, m.p. 204–206°.

EXAMPLE 5

$d$-Estra-1,3,5(10),7-Tetraene-3,17$\beta$-Diol
(17$\beta$-Dihydroequilin)

Charge a steel bomb with $d$-3-methoxy-estra-1,3,5(10), 7-tetraen-17$\beta$-ol, formate (1.50 g.) and concentrated aqueous ammonium hydroxide solution (8 ml. of 28.6% assay of ammonia), seal and heat in a Woods metal bath to 250° C. for 6 hours. Cool, pour the contents into water and add solid ammonium chloride and sodium chloride. Extract with ethyl acetate, wash, dry and evaporate the extract in vacuo. Crystallize from chloroform to obtain 0.27 g. of $d$-estra-1,3,5(10),7-tetraene-3,17$\beta$-diol (17$\beta$-dihydroequilin), m.p. 150–154°.

EXAMPLE 6

$d$-Estra-1,3,5(10)-Triene-3,8$\alpha$,17$\beta$-Triol

Charge a steel bomb with solid sodium methoxide (2.0 g.), dry methanol (10 ml.) and $d$ - 3 - methoxyestra-1,3,5(10)-triene-8$\alpha$,17$\beta$-diol (1.00 g.). Seal and heat in a Woods metal bath to 230–235° C. for 5 hours. Cool, pour the contents into water then add ammonium chloride and sodium chloride to precipitate the product. Extract with ethyl acetate, then wash, dry and evaporate the extract in vacuo. Triturate the residue with benzene and filter to get 0.54 g. of $d$-estra-1,3,5(10)-triene-3,8$\alpha$,17$\beta$-triol, m.p. 190–196°.

EXAMPLE 7

$dl$-13-Ethylgona-1,3,5(10),8-Tetraene-3,17$\beta$-Diol

Charge a steel bomb with $dl$-3-methoxygona-13-ethyl-1,3,5(10),8 - tetraen - 17$\beta$ - ol (1.00 g.) and 40% aqueous methylamine solution (10 ml.), seal then heat in a Woods metal bath to 280° C. for 3.5 hours. Cool and pour the contents into cold water, add solid ammonium chloride and sodium chloride and extract with ethyl acetate. Wash, dry and evaporate the extract *in vacuo*. Treat the oil in tetrahydrofuran with activated charcoal, filter and evaporate the solvent *in vacuo*. Crystallize to obtain *dl*-13-ethyl-gona-1,3,5(10),8-tetraene-3,17β-diol, m.p. 118°–120° then 183°–184°.

EXAMPLE 8

*dl*-13-Ethylgona-1,3,5(10),7-Tetraene-3,17β-Diol

Charge a steel bomb with *dl*-3-methoxygona-13-ethyl tetraen-17β-ol (1.00 g.) and 40% aqueous methylamine solution (10 ml.), seal then heat in a Woods metal bath to 290° C. for 3 hours. Cool and pour the contents into cold water, add solid ammonium chloride and sodium chloride and extract with ethyl acetate. Wash, dry and evaporate the extract *in vacuo*. Treat the oil in tetrahydrofuran with activated charcoal, filter and evaporate the solvent *in vacuo*. Crystallize to obtain *dl* - 13 - ethylgona-1,3,5(10),7-tetraene-3,17β-diol, m.p. 218–220°.

I claim:

1. A process for preparing a compound of the formula

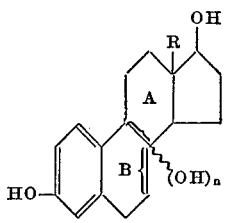

I wherein R is alkyl of from 1 to 6 carbon atoms; A and B are both saturated linkages and *n* is 1, or one of A and B is an unsaturated linkage and *n* is 0; which comprises treating a compound of the formula

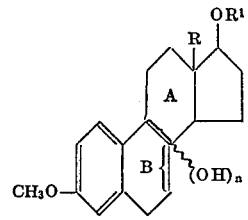

II wherein A, B, R, and *n* are as defined above and $R^1$ is hydrogen or carboxylic acyl of from 1 to 6 carbon atoms; with a base selected from the group of aqueous methylamine, ammonium hydroxide, or an alkali metal alkoxide containing from 1 to 6 carbon atoms in an alkanol containing from 1 to 6 carbon atoms; at a temperature of from 180° to 300° C.

2. The process of Claim 1 wherein R is methyl.
3. The process of Claim 1 wherein R is ethyl.
4. The process of Claim 1 wherein the base is aqueous methylamine.
5. The process of Claim 1 wherein the base is concentrated ammonium hydroxide.
6. The process of Claim 1 wherein the base is sodium methoxide in methanol.
7. The process of Claim 1 wherein A is a saturated linkage, B is an unsaturated linkage and *n* is 0.
8. The process of Claim 1 wherein A is an unsaturated linkage, B is a saturated linkage and *n* is 0.
9. The proces of Claim 1 wherein A and B are saturated linkages and *n* is 1.

No references cited.

HENRY A. FRENCH, Primary Examiner